United States Patent
Tran et al.

(10) Patent No.: US 7,856,051 B2
(45) Date of Patent: Dec. 21, 2010

(54) APPARATUS, AND ASSOCIATED METHOD, FOR SELECTING WHETHER TO REJECT AS INVALID A DATA SEGMENT RECEIVED AT A COMMUNICATION STATION

(75) Inventors: Phat Hong Tran, Waterloo (CA); Xing Qian, Waterloo (CA)

(73) Assignee: Research In Motion Limited, Waterloo (CA)

( * ) Notice: Subject to any disclaimer, the term of this patent is extended or adjusted under 35 U.S.C. 154(b) by 975 days.

(21) Appl. No.: 11/627,211

(22) Filed: Jan. 25, 2007

(65) Prior Publication Data

US 2008/0171543 A1    Jul. 17, 2008

Related U.S. Application Data

(60) Provisional application No. 60/885,151, filed on Jan. 16, 2007.

(51) Int. Cl.
*H04B 17/00* (2006.01)

(52) U.S. Cl. ...................................................... 375/225

(58) Field of Classification Search ................. 375/224, 375/225, 227, 340; 324/76.11, 76.41
See application file for complete search history.

(56) References Cited

U.S. PATENT DOCUMENTS

| 6,084,888 A | * | 7/2000 | Watanabe et al. ............ 370/473 |
| 2003/0030750 A1 | | 2/2003 | Hoarty et al. |
| 2007/0147485 A1 | * | 6/2007 | Sakamoto et al. ............ 375/219 |
| 2009/0034597 A1 | * | 2/2009 | Kobayashi et al. ............ 375/224 |

FOREIGN PATENT DOCUMENTS

| EP | 0858180 A2 | 8/1998 |
| WO | 9712491 A1 | 4/1997 |
| WO | 2004021658 A1 | 3/2004 |

* cited by examiner

Primary Examiner—Young T. Tse

(57) ABSTRACT

Apparatus, and an associated method, for determining whether to accept as valid a data segment, such as a radio block communicated pursuant to an EDGE communication session. A bit error rate measurer measures the bit error rate of a header part of a received radio block. The measured bit error rate is compared against a selected threshold. Results of the comparison are determinative of whether the radio block is accepted as valid or rejected as corrupted.

28 Claims, 3 Drawing Sheets

APPARATUS, AND ASSOCIATED METHOD, FOR SELECTING WHETHER TO REJECT AS INVALID A DATA SEGMENT RECEIVED AT A COMMUNICATION STATION

CROSS REFERENCE TO RELATED APPLICATION

The present invention claims the priority of provisional patent application No. 60/885,151, filed on Jan. 16, 2007, the contents of which are incorporated herein by reference.

The present invention relates generally to a manner by which to determine whether to reject, or to accept, the data of a data segment received at a communication station, such as an EDGE-capable mobile station of a GPRS/EDGE, cellular communication system. More particularly, the present invention relates to apparatus, and an associated method, by which to make determination of whether to reject, or to accept, the contents of a data segment as invalid, or valid, responsive to measurement of the BER (bit error rate) of the header part of the data segment.

If the header part, FEC-protected by forward error correction (FEC) coding, exhibits a BER worse than a selected threshold, the data segment is considered to be invalid and discarded. Conventional schemes, which only utilize data-segment payload CRC (cyclic redundancy code) analysis to determine whether to accept a data segment as valid, are prone to false passage of a CRC check. Through measurement of the BER of a header part of the data segment, and in its use to determine whether to reject the data segment as invalid, the erroneous acceptance of the data segment as valid due to a false passage of a CRC check of the payload part of the data segment is prevented.

BACKGROUND OF THE INVENTION

Digital communication techniques are widely employed in many different types of communication systems. Generally, use of digital communication techniques permits the communication of data at significantly higher data throughput rates, with greater efficiency, than that permitted through the use of conventional, analog communication techniques. Information that is to be communicated is converted, or otherwise provided, in digital form. Typically, the data is formatted pursuant to a standardized, formatting scheme, known to both a sending station at which the data originates and a receiving station at which the data terminates. The sending and receiving stations are interconnected by way of a communication channel upon which the data is communicated. In a radio communication system, the communication channel is defined, at least in part, upon a radio link extending between the communication stations.

In an actual communication system, the communication channel is imperfect. That is to say, the data is sometimes distorted during its communication upon the communication channel. The informational content of data, once received at the receiving station, is distorted. If the distortion is severe, the informational content of the data cannot be recovered.

Various schemes have been developed that provide manners by which the distortion introduced upon the data is corrected or by which to compensate for the distortion. Coding of data, prior to its communication, to increase its redundancy is one such type of scheme. And, communication of known values, or sequences of values, is sometimes also used to determine whether data received at a receiving station has adequately been decoded.

An exemplary, digital cellular communication system, a GPRS/EDGE (general packet radio service/enhanced data for GSM evolution) cellular communication system, communicates coded data between sending and receiving stations pursuant to effectuation of an EDGE communication service. Data formatted into radio blocks are sent by the sending station to the receiving station. A radio block includes a header part and a payload part. And, the payload part of the radio block includes a 12-bit CRC (cyclic redundancy code), and, optionally, is FEC-protected. The header part of the radio block includes an 8-bit CRC and is also FEC (forward error correction)-protected more strongly than the payload part. The CRC of the payload part of the radio block is used to determine whether the payload part has been correctly decoded. However, it is sometimes possible for an erroneous determination to be made that the payload part has been decoded correctly even when the payload part has been decoded incorrectly. That is to say, an erroneous determination is made. With the CRC of a 12-bit length, a random data block is likely falsely to pass the CRC check once every 4,096 times. In a lengthy data transfer, tens of thousands of radio blocks might be received. In bad signal conditions, a few corrupt radio blocks will pass the CRC check and be accepted as valid, in error.

Once the data is accepted as valid, the data is passed to a higher logical layer to form part of a data block, a PDU (packet data unit). The higher-layer, data block is formed of, typically, dozens of lower layer radio blocks. If a bad, i.e., corrupted, radio block forms part of the higher-layer data block, the higher data-layer data block is also corrupted. When the corruption is detected, a complete retransmission of all of the radio blocks of the higher-layer data block might be caused to ensue, resulting in significant delay, and much unnecessary retransmission. Additionally, the higher-layer retries are sometimes based on timeouts. Corruption at the higher layers might further stall data flow until a timer expires and triggers a retransmission of the data block. Stalled data flow leads to poor data throughput rates.

An improved manner by which better to ensure that a corrupted radio block is not erroneously accepted as valid would therefore be advantageous.

It is in light of this background information related to communication of data using digital communication techniques that the significant improvements of the present invention have evolved.

DETAILED DESCRIPTION

Figure 1:
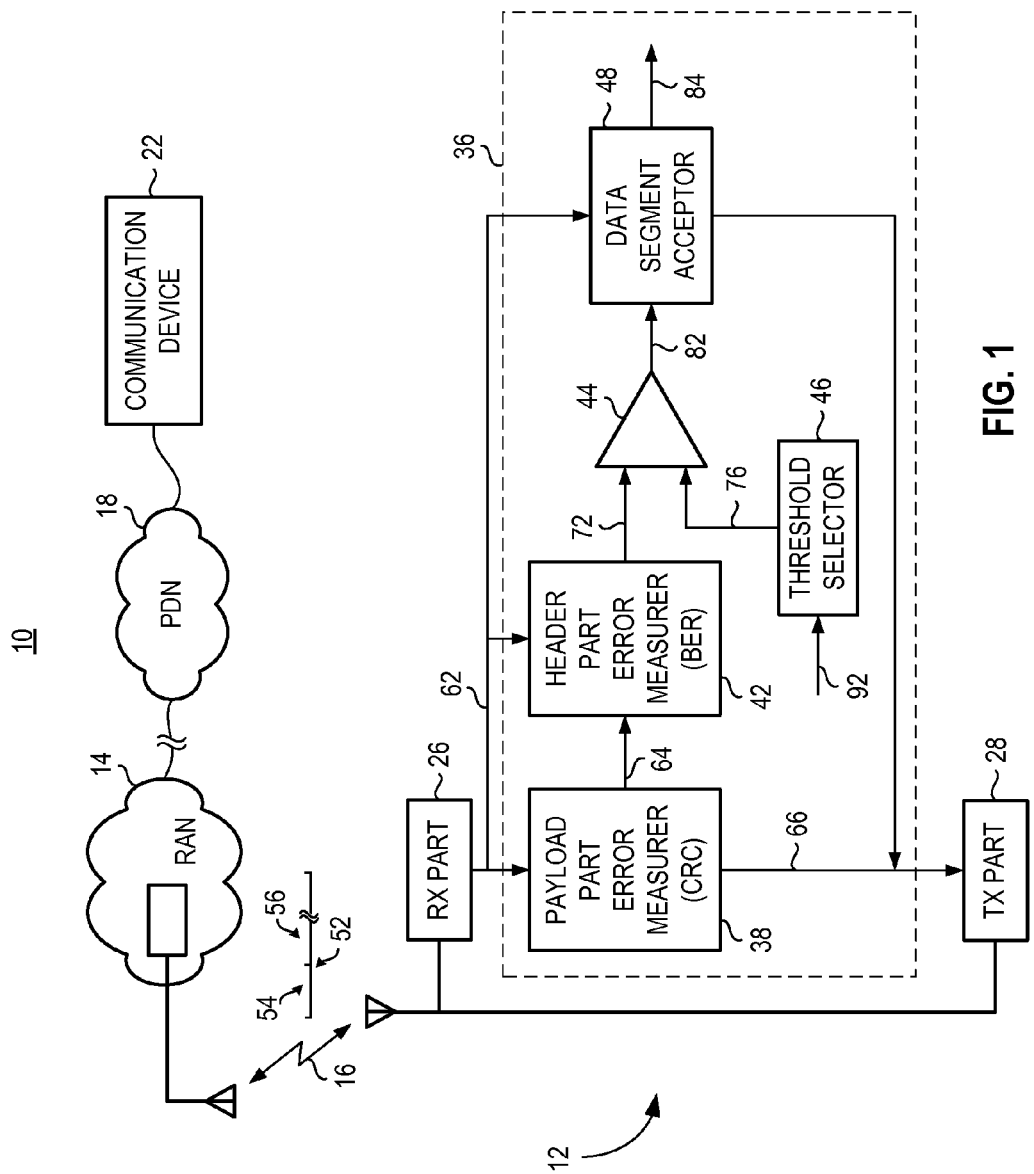
FIG. 1 illustrates a functional block diagram of a radio communication system in which an embodiment of the present invention is operable.

The present invention, accordingly, advantageously provides apparatus, and an associated method, by which to determine whether to reject, or accept, the data of a data segment received at a communication station, such as an EDGE-capable mobile station of a GPRS/EDGE, cellular communication system, as valid data.

Through operation of an embodiment of the present invention, a manner is provided in which to make determination of whether to accept, or reject, the contents of a data segment as valid responsive to measurement of the BER (bit error rate) of the header part of the data segment.

In one aspect of the present invention, a determination is made as to whether the header part of the data segment, FEC-protected by forward error correction (FEC) coding, exhibits a BER worse than a selected threshold, the data segment is rejected, i.e., the data segment is not accepted as valid data. The data segment includes both the header part and a payload part. Both, e.g., the header and payload parts are FEC-protected with the header part FEC-protected more strongly than the payload part.

In another aspect of the present invention, when a data segment is received, a bit error rate measure measures the bit error rate of the header part of the data segment. In a typical communication scenario, a large number of data segments, radio blocks, are received in succession. The bit error rate measure, in such a scenario, measures the bit error rates of each of the data segments that is received at the communication station. In other implementations, other quality indicia measurements are made of the header part of the data segment.

In another aspect of the present invention, the bit error rate of the header part of the data segment, once measured by the bit error rate measurer, is compared with a threshold value. If the bit error rate is worse than the threshold value, the data segment is rejected as invalid. That is to say, if the BER of the header part of the data segment is worse than the threshold, a conclusion is made that the payload part of the data segment is correspondingly of poor quality. The rejection of the data segment is correspondingly of poor quality. The rejection of the data segment precludes the possibility of determination by other mechanism, in error, that the data segment is valid.

In another aspect of the present invention, the threshold against which the measured bit error rate is compared is selectable. That is to say, the threshold is a selected value, selected from amongst a plurality of different threshold values. The determination of whether the segment should be rejected as invalid data is made dependent, in part, upon the selection of the threshold value. In one implementation, the data segment is coded pursuant to a selected coding scheme of a plurality of coding schemes. The different coding schemes are of differing coding parameters. The selection of the threshold value is, e.g., responsive to the coding scheme used by which to code the data of the data segment. If, during the course of the typical scenario in which a large plurality of data segments are successively communicated, the coding scheme by which the data segments are coded changes, the threshold used for purposes of the comparison is correspondingly changeable.

In another aspect of the present invention, a CRC check is first performed upon the payload part of the data segment is first performed, prior to measurement of the bit error rate of the header part by the bit error rate measurer. If the CRC check of the payload part of the data segment is passed, then bit error rate measurer measures the bit error rate of the header part of the data segment. And, the measured bit error rate is compared against a threshold value, and a determination is made whether to accept the data segment as valid or to reject the data segment. Thereby, the data segment must both pass the CRC check upon the payload part and the bit error rate measurement test upon the header part for the data segment to be accepted as valid. Erroneous acceptance as valid of a data segment due to false passage of the CRC check does not result in an acceptance of the data segment as valid because the bit error rate measurement, and comparison against a threshold, is further performed. When the CRC check is passed, the acceptance of the data segment is only conditionally accepted. The data segment must further pass the bit error rate measurement test of the header part for the data segment to be accepted as valid. Alternately, the BER measurement is first performed and used to determine whether the BER is better than the threshold value. If better than the threshold value, then the CRC check is performed upon the payload part.

In another aspect of the present invention, a radio block is formed of a header part and a payload part. Both the header and payload parts are FEC- and CRC-protected. The header part, however, is more strongly FEC-protected than that of the payload part. Because of the stronger FEC protection of the header part, BER measurement of the header part, BER measurement of the header part remains reliable even if distortion of the payload part values renders its CRC-check unreliable, the header-part, BER measurement remains reliable. And BER measurement is performed upon the header part of the radio block as an added check, in addition, e.g., to the CRC check performed upon the payload part.

In another aspect of the present invention, upon acceptance of the data segment as valid, the data is passed on to a higher logical layer, and the data, i.e., the payload part, is used to form part of a data block, such as a PDU (packet data unit). By ascertaining that the bit error rate of the header part of the lower logical layer data segment is better than the threshold value, the higher-layer data block, including the data of the passed data segment, is less likely to contain corrupted data. Improved communication performance results.

In these and other aspects, therefore, apparatus, and an associated method, is provided for selecting whether to receive a received data segment as valid. The data segment has a header part and a payload part. A header part error measurer is adapted to analyze the header part of the data segment. The header part error measurer is configured to measure a bit error rate of the header part. A data segment acceptor is configured selectably to accept the data segment as valid responsive, at least in part, to the bit error rate of the header part measured by the header part error measurer.

Referring first, therefore to FIG. 1, a communication system, shown generally at 10, provides for radio communications with mobile stations, of which the mobile station 12 is representative.

Communications are carried out between the mobile station and a network part, here represented by a radio access network (RAN) 14. Communications are effectuated by way of a radio air interface, represented by the segment 16 upon which network-originated data is sent to mobile station 12, and mobile-originated data is communicated by way of the radio-air interface to the radio access network and to communication devices coupled thereto. The radio access network is coupled to an external network, here represented by a packet data network (PDN) 18. Communication devices, such as the communication device 22 is positioned in communication connectivity with the packet data network. The communication device is representative of a communication endpoint of communications with the mobile station 12 pursuant to a communication session.

In the exemplary implementation, the radio part of the communication system comprises a GSM/GPRS/EDGE (global system for mobile communications/general packet radio service/enhanced data for GSM evolution), cellular communication system that provides for high speed data communication services. More generally, the radio part of the communication system is representative of any of various communication systems that provide data services through the communication of data segments. In the exemplary implementation, such data segments are, at times, referred to as EDGE radio blocks, each formed of a header part and a payload part. Accordingly, while the following description shall describe exemplary operation with respect to the exemplary implementation of a cellular communication system that provides for EDGE communication services, the teachings of the present invention are analogously also applicable in other types of communication systems. Additionally, downlink communications are described. Uplink communications are analogous and operation of entities at the network part of the system 10, while not separately shown, are analogously operable.

A mobile station includes transceiver circuitry, here represented by a receive (RX) part 26 and a transmit (TX) part 28. Data that is communicated to the mobile station is received at the receive part, and data that is communicated by the mobile station is transmitted by the transmit part. When the mobile station is used pursuant to effectuation of a data communication service, radio blocks, that is, data segments, are received at the mobile station. Due to fading conditions, noise, receiver front-end distortion, and other causes of distortion that distort values of the data segment, the values of the data segment, operated upon at the mobile station differ with the corresponding values, when sent. If the mobile station is unable to compensate for the distortion, either through its correction or retransmission, communication problems result. As mentioned previously, when CRC (cyclic redundancy code) analysis is performed, there is a possibility that an erroneous radio block shall be accepted as valid. As a data block, accepted as valid, is passed on to a higher, logical layer, passage of an erroneously accepted data block causes higher-layer communication problems, and potentially significant communication delays when an entire data block, formed of numerous radio blocks have to be retransmitted.

Pursuant to operation of an embodiment of the present invention, the mobile station 12 further includes apparatus, shown generally at 36, of an embodiment of the present invention. The apparatus 36 is formed of functional entities, implementable in any desired manner, such as, e.g., by algorithms executable by processing circuitry. The functions performed by the entities of the apparatus are further implementable at any location, such as by a controller of the mobile station or, as part of the transceiver circuitry of the mobile station.

Here, the apparatus includes a payload part error measurer 38, a header part error measurer 42, a comparator 44, a threshold selector 46, and a data segment acceptor 48.

A data segment 52, i.e., a radio block, together with its header part 54 and a payload part 56 are also shown in FIG. 1. When a data segment is received at the mobile station, the received part detects its delivery at the mobile station. And, an indication of the data segment is provided, here represented by way of the line 62, to the payload part error measurer. In the exemplary implementation, the payload part error measurer comprises a CRC checker that checks the CRC contained in the payload part of the received data segment. If the CRC check checks out, i.e., passes the CRC check, an indication of its passage is provided, here represented by way of the line 64, to the header part error measurer 42. The indication of the detected data segment, provided by way of the line 62, is also provided to the header part error measurer. The error measurer operates to measure the bit error rate of the header part of the radio block provided thereto. And, an indication of the results of the measurement are provided on the line 72. In the exemplary implementation, the header part error measurer operates only if an indication is provided by the payload part error measurer that the CRC check is successfully passed.

The bit error rate value measured by the header part error measurer 42 is compared at the comparator against a threshold value, here represented to be provided by way of the line 76. The threshold value is, in the exemplary implementation, a selectable value, selected by the threshold selector 46. Results of comparisons performed by the comparator are provided, here represented by way of the line 82 to the data segment acceptor 48. The data segment acceptor selects whether to accept the data segment, provided thereto on the line 62, as valid. If the data segment is accepted as valid, the data segment is passed on, here indicated by the line 84. If the results of the comparison indicate that the bit error rate of the header part of the data segment is worse than the selected threshold applied on the line 76, the data segment acceptor does not accept the data segment as valid and, instead, causes the data segment to be rejected with a rejection indication generated on the line 66. Here, the line 66 extends to the transmit part of the mobile station whereat an indication of the rejection is returned to the network to request retransmission of the rejected data segment. Because the detection is made of the error at the low logical layer, the error is corrected quickly and without delays that might be associated if the error is only detected at a higher logical layer once an entire group of radio blocks formed of the data segments are combined into a packet data unit or other data block analogously formed of the plurality of data segments. In an alternate embodiment, the header part BER measurement and analysis is performed prior to the CRC check performed upon the payload part.

In the exemplary implementation, operation of the threshold selector to select the threshold value that is applied by way of the line 76 to the comparator 44 is made responsive to input applied to the selector by way of the line 92. The line 92 indicates the level of coding of the data segment detected at the received part of the mobile station. The coding scheme, in a communication session in which EDGE data is provided is one of nine coding levels, designated as MCS-1 to MCS-9. Responsive to the coding scheme used, the threshold selector selects a threshold value to be used responsive to the coding scheme. And, accordingly, the results of the comparison, and operation of the acceptor 48 are, correspondingly, also dependent in part on the threshold values selected by the selector.

Figure 2:
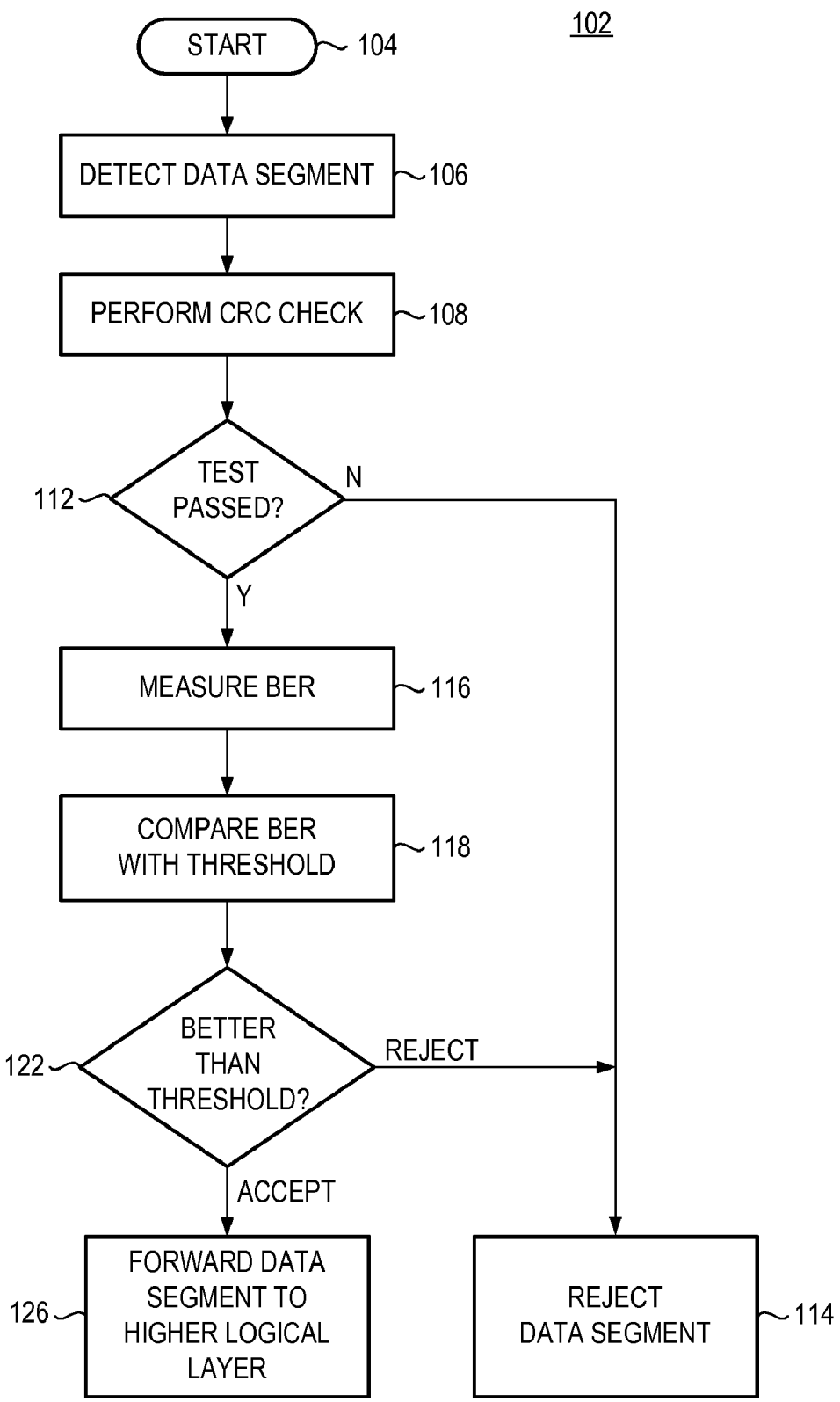
FIG. 2 illustrates a process diagram representative of the process of operation of an embodiment of the present invention.

FIG. 2 illustrates a process diagram, shown generally at 102, representative of the process of operation of an embodiment of the present invention. The process starts, indicated by the start block 104, with detection, indicated by the block 106, of a data segment, such as the EDGE radio block.

A CRC check is performed, indicated by the block 108, upon the payload part of the detected data segment. A determination is then made, indicated by the decision block 112, as to whether the payload part of the data segment has passed the CRC check. If not, the no branch is taken, and the data segment is rejected indicated by the block 114. If, conversely, the CRC check is passed, the yes branch is taken. Passage of the CRC check is but a conditional acceptance of the data segment. The yes branch extends to the block 116, and a bit error rate measurement of the header part of the received data segment is performed. Then, and as indicated by the block 118, a comparison is made between the measured bit error rate and a selected threshold value. A determination is then made, indicated by the decision block 122, as to whether the results of the comparison indicate the bit error rate to be better or worse than the selected threshold. If worse than the selected threshold, the reject branch is taken to the reject block 114. Otherwise, if the accept branch is taken, the data segment is accepted as valid, and the data segment is forwarded, indicated by the block 126, to a higher logical layer. When delivered to the higher logical layer, the data segment becomes part of a larger data block, such as a packet data unit.

Figure 3:
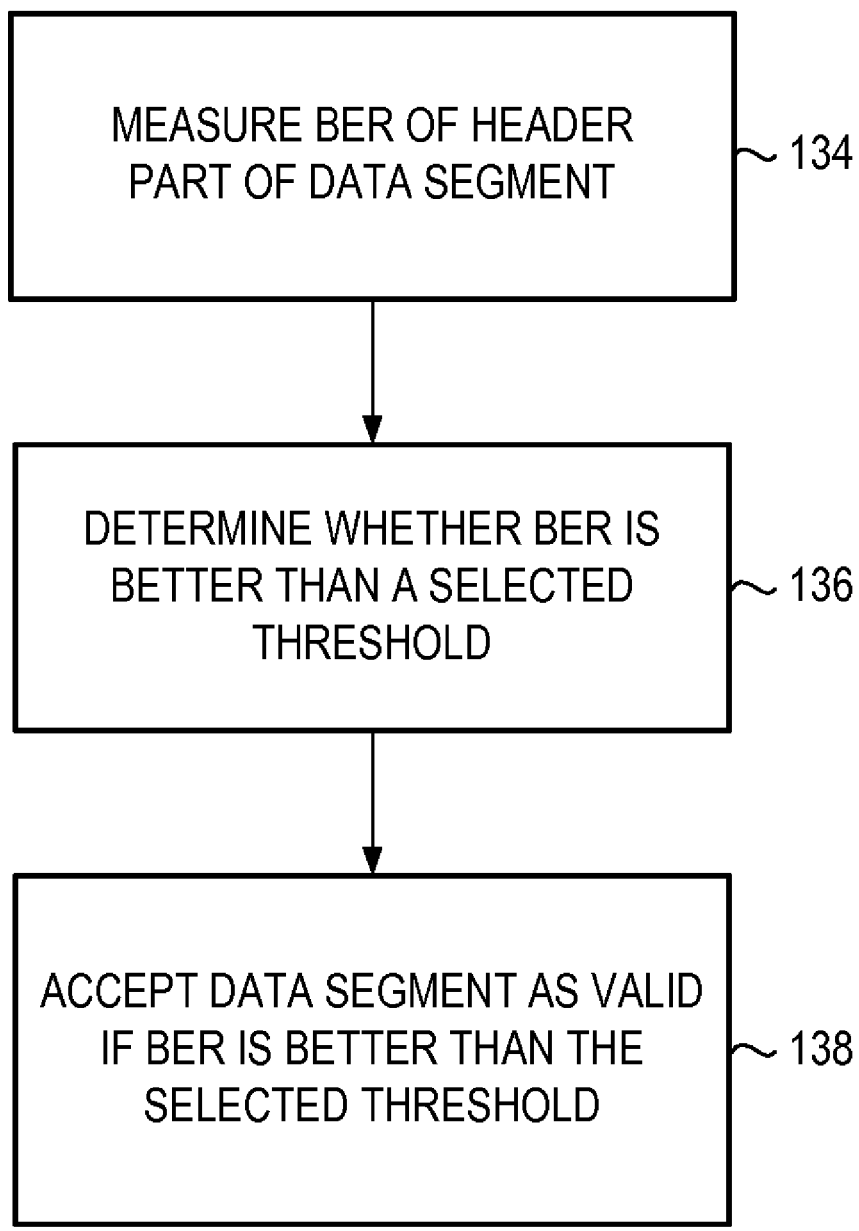
FIG. 3 illustrates a method flow diagram representative of the method of operation of an embodiment of the present invention.

FIG. 3 illustrates a method flow diagram, shown generally at 132, representative of the method of operation of an embodiment of the present invention. The method facilitates selection of whether to accept a received data segment as valid. The data segment has a header part and a payload part.

First, and as indicated by the block 134, a bit error rate of the header part of the data segment is measured. Then, and as indicated by the block 136, a determination is made as to whether the bit error rate of the header part is better than a first selected threshold.

Thereafter, and as indicated by the block 138, the data segment is valid responsive, at least in part, to determination that the bit error rate of the header part is better than the first selected threshold.

Thereby, a manner is provided by which to make determination of the validity of a received data segment based upon measurement of the bit error rate of the header part of the data segment. Conventional schemes, which utilize merely the analysis of a CRC contained in payload part of the data segment, that are prone to erroneous acceptance as valid of the data segment are supplemented, or improved upon, by the additional, or alternate, analysis of the bit error rate of the header part. Problems associated with the erroneous acceptance as valid of the data of the corrupted data segment are reduced.

What is claimed is:

1. Apparatus for selecting whether to accept a received data segment as valid, the data segment having a header part and a payload part, said apparatus comprising:
   a header part error measurer adapted to analyze the header part of the data segment, said header part error measurer configured to measure a bit error rate of the header part; and
   a data segment acceptor configured selectably to accept the data segment, including both the header part and the payload part, as valid responsive at least in part to the bit error rate of the header part measured by said header part error measurer.

2. The apparatus of claim 1 further comprising a comparator adapted to receive an indication of the bit error rate measured by said header part error measurer, said comparator configured to compare the indication of the bit error rate with a selected threshold value.

3. The apparatus of claim 2 wherein said data segment acceptor is adapted to receive indication of comparison made by said comparator, acceptance of the data segment by said data segment acceptor as valid responsive to the indication of the comparison.

4. The apparatus of claim 2 wherein the selected threshold value comprises a selected one of the first selected threshold value and at least a second selected threshold value.

5. The apparatus of claim 4 wherein the data segment is encoded by a selected coding scheme and wherein the selected one of the first and at least second selected threshold values, respectively, is responsive to the selected coding scheme.

6. The apparatus of claim 5 further comprising a threshold selector adapted to receive an indication of the selected encoding scheme, said threshold selector configured to select the selected one of the first and at least second selected threshold values responsive to the indication of the selected encoding scheme.

7. The apparatus of claim 1 wherein the data segment is received at a mobile station, the mobile station defined in terms of logical layers and wherein said header part error measurer and said data segment acceptor are embodied at a first logical layer.

8. The apparatus of claim 7 wherein the mobile station further comprises a second logical layer, logically positioned above the first logical layer, and wherein said data segment acceptor is further configured to provide values of the payload part of the data segment to the second logical layer.

9. The apparatus of claim 8 wherein the payload part of the data segment accepted as valid and provided to the second logical layer forms part of a second logical layer data block, once provided thereto.

10. The apparatus of claim 1 further comprising a payload part error measurer adapted to analyze the payload part of the data segment, said payload part error measurer configured to measure a cyclic redundancy code (CRC) of the payload part.

11. The apparatus of claim 10 wherein said data segment acceptor is further configured selectably to accept the data segment as valued further responsive to the CRC of the payload part measured by said payload part error measurer.

12. The apparatus of claim 1 wherein the data segment comprises an EDGE-formatted data segment and wherein the EDGE-formatted data segment, subsequent to acceptance by said data segment acceptor is configured as part of a data block.

13. A method of selecting whether to accept a received data segment as valid, the data segment having a header part and a payload part, said method comprising the operations of:
   measuring a bit error rate of the header part;
   determining whether the bit error rate of the header part is better than a first selected threshold; and
   accepting the data segment, including both the header part and the payload part, as valid responsive, at least in part, to determination during said operation of determining, that the bit error rate of the header part is better than the first selected threshold.

14. The method of claim 13 further comprising the operation of selecting the first selected threshold.

15. The method of claim 14 wherein the data segment is coded pursuant to a selected coding scheme and wherein selection of the selected threshold during said operation of selecting is responsive to the selected coding scheme.

16. The method of claim 13 further comprising the operation of measuring a cyclic redundancy code (CRC) of the payload part.

17. The method of claim 16 wherein said operation of accepting is further responsive to the CRC of the payload part.

18. Apparatus for a communication station that receives a data block formed of data segments received at the communication station, the data segments each comprised of a header part and a payload part, said apparatus comprising:
   a header part error measurer adapted to analyze header parts of the data segments received at the communication station, the header parts FEC, forward error corrected, more strongly than the payload parts, said header part error measurer configured to measure bit error rates of the header parts;
   a data segment acceptor configured selectably to accept individual ones of the data segments as valid responsive to bit error rates of associated header parts thereof measured by said header part error measurer; and
   a data block former configured to form the data block comprised of the payload parts of data segments accepted by said data segment acceptor.

19. Apparatus for selecting whether to accept a received data segment as valid, the data segment having a header part and a payload part, said apparatus comprising:

a payload part error measurer, adapted to check a cyclic redundancy code (CRC) in the payload part of the data segment and, if the CRC in the payload part passes the CRC check, provide a signal indicating that the payload part CRC check passed;

a header part error measurer, which is operatively coupled to the payload part error measurer and adapted to analyze the header part of the data segment, in response to the signal indicating that the payload part CRC passed the CRC check, said header part error measurer configured to measure a bit error rate of the header part; and a data segment acceptor configured selectably to accept the data segment as valid responsive at least in part to the CRC check having been passed and the bit error rate of the header part measured by said header part error measurer.

20. The apparatus of claim 19 further comprising a comparator adapted to receive an indication of the bit error rate measured by said header part error measurer, said comparator configured to compare the indication of the bit error rate with a selected threshold value.

21. The apparatus of claim 20 wherein said data segment acceptor is adapted to receive indication of comparison made by said comparator, acceptance of the data segment by said data segment acceptor as valid responsive to the indication of the comparison.

22. The apparatus of claim 20 wherein the selected threshold value comprises a selected one of a first selected threshold value and at least a second selected threshold value.

23. The apparatus of claim 22 wherein the data segment is encoded by a selected coding scheme and wherein the selected one of the first selected threshold value and at least second selected threshold value, respectively, is responsive to the selected coding scheme.

24. The apparatus of claim 23 further comprising a threshold selector adapted to receive an indication of the selected encoding scheme, said threshold selector configured to select the selected one of the first selected threshold value and at least second selected threshold value responsive to the indication of the selected encoding scheme.

25. The apparatus of claim 19 wherein the data segment is received at a mobile station, the mobile station defined in terms of logical layers and wherein said header part error measurer and said data segment acceptor are embodied at a first logical layer and wherein said data segment acceptor is further configured to provide values of the payload part of the data segment to a second logical layer, said second logical layer logically positioned above the first logical layer, the payload part of the data segment, when accepted as valid and provided to the second logical layer, forms part of a second logical layer data block, once provided thereto.

26. A method of selecting whether to accept a received data segment as valid, the data segment having a header part and a payload part, said method comprising the operations of:
  performing a check of a cyclic redundancy code (CRC) in the payload part, and if the CRC in the payload part passes the CRC check, then:
  measuring a bit error rate of the header part, and
  determining whether the bit error rate of the header part is better than a selected threshold; and
  if the CRC in the payload part passes the check and if the bit error rate of the header part is better than the selected threshold, then:
  accepting the data segment as valid responsive, at least in part, to determination during said operation of determining, that the CRC in the payload part passes the check and that the bit error rate of the header part is better than the selected threshold.

27. The method of claim 26 further comprising the operation of selecting the selected threshold.

28. The method of claim 27 wherein the data segment is coded pursuant to a selected coding scheme and wherein selection of the selected threshold during said operation of selecting is responsive to the selected coding scheme.

* * * * *